Figure 1:
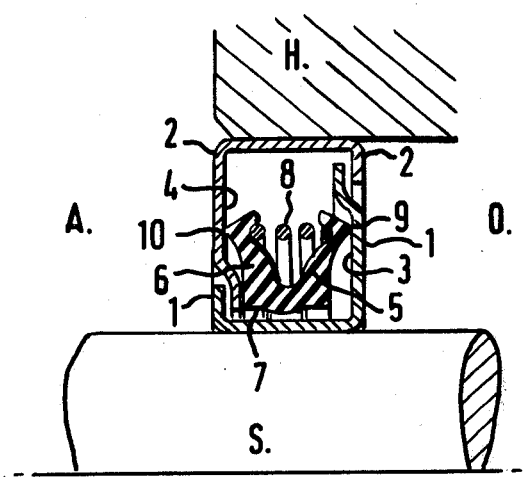

United States Patent [19]

Johnston

[11] 4,348,031
[45] Sep. 7, 1982

[54] ROTARY FLUID SEALS WITH FLOATING SEALING RINGS

[75] Inventor: David E. Johnston, Gosforth, England

[73] Assignee: George Angus & Company Limited, Newcastle upon Tyne, England

[21] Appl. No.: 241,647

[22] Filed: Mar. 9, 1981

[30] Foreign Application Priority Data

Mar. 18, 1980 [GB] United Kingdom ............... 8009057

[51] Int. Cl.³ ............................................. F16J 15/34
[52] U.S. Cl. ..................................... 277/83; 277/25; 277/95; 277/177
[58] Field of Search .................. 277/25, 83, 84, 95, 277/152, 153, 173–177

[56] References Cited

U.S. PATENT DOCUMENTS

| | | | |
|---|---|---|---|
| 2,561,694 | 7/1951 | Gilbert | 277/25 |
| 2,888,281 | 5/1959 | Ratti | 277/25 |
| 3,275,334 | 9/1966 | Voitik | 277/84 X |
| 3,504,917 | 4/1970 | Malmstrom | 277/25 |
| 3,511,511 | 5/1970 | Voitik | 277/25 X |
| 4,037,849 | 7/1977 | Thumm | 277/153 X |
| 4,188,039 | 2/1980 | Krisak et al. | 277/95 |

FOREIGN PATENT DOCUMENTS

| | | | |
|---|---|---|---|
| 1245237 | 7/1967 | Fed. Rep. of Germany | 277/25 |
| 55-10132 | 1/1980 | Japan | 277/83 |
| 591522 | 8/1947 | United Kingdom | |

Primary Examiner—Robert S. Ward, Jr.
Attorney, Agent, or Firm—William R. Hinds

[57] ABSTRACT

A rotary fluid seal, especially an oil seal for a rotary shaft, comprises a sealing ring between axially-opposed divergent frusto-conical counterfaces of relatively rotatable members, preferably casing rings in a self-contained seal unit, the sealing ring having a pair of divergent sealing lips presenting frusto-conical contact faces to the counterfaces and being substantially coaxial with but floating freely between the relatively rotatable members, the contact faces bearing frictionally on the counterfaces so that, on relative rotation of the members, the sealing ring is frictionally driven into rotation by one or other of the members and the effect of centrifugal force, tending to cause the sealing lips to flex angularly outwardly, reduces the bearing load of the contact faces on the counterfaces.

7 Claims, 5 Drawing Figures

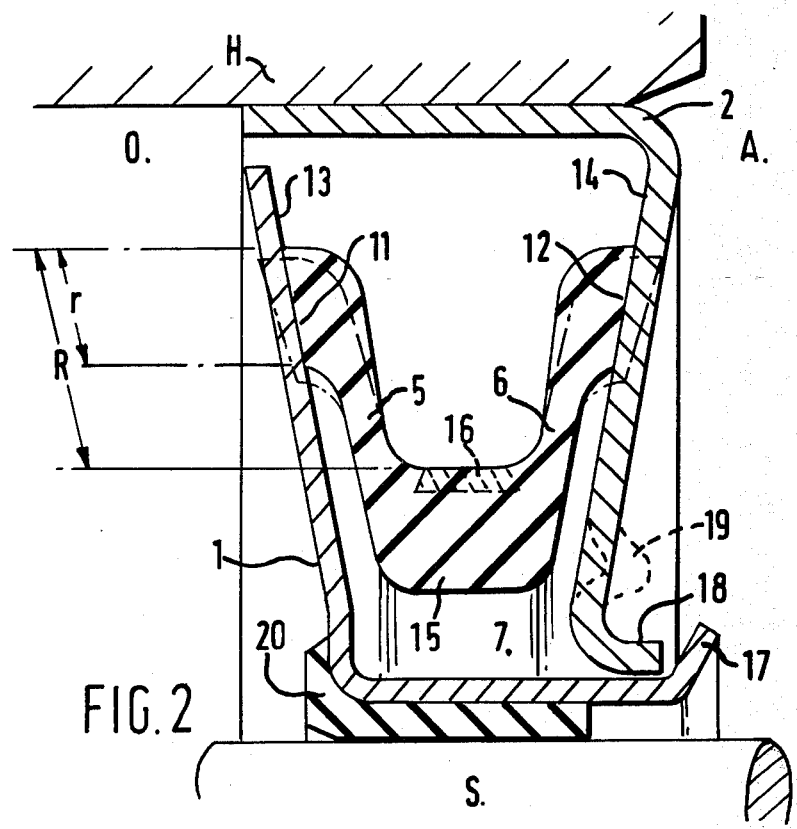
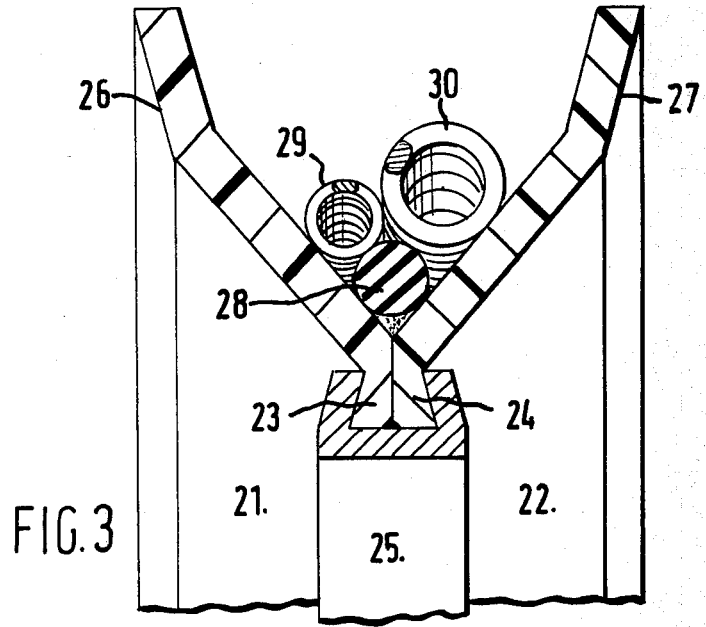

ROTARY FLUID SEALS WITH FLOATING SEALING RINGS

This invention relates to rotary fluid seals and especially oil seals for rotary shafts although the application of the invention to sealing liquids other than oil, and even gas, against leakage between relatively rotatable members is not excluded.

There has previously been proposed, in particular in United Kingdom Patent Specification No. 591 522 (George Angus and Company Limited and another), a rotary fluid seal, for preventing leakage of fluid between two coaxial relatively rotatable members, comprising a circular flexible sealing ring freely located to float substantially coaxially between axially opposed counterfaces of the relatively rotatable members, the sealing ring having a pair of radially outwardly divergent, oppositely axially directed, annular sealing lips to bear resiliently against the counterfaces respectively, so that the sealing ring is frictionally driven into rotation by one or the other of the members on relative rotation thereof.

According to the present invention, in a rotary fluid seal of the above kind, the sealing lips each present to the respective counterface a frusto-conical contact free defined by radially inner and outer peripheral edges and the counterfaces are radially outwardly divergent and frusto-conical for face contact by the sealing lip contact faces, so that the sealing ring is substantially coaxially located by seating between the counterfaces, and the effect of centrifugal force due to rotation of the sealing ring, tending to cause the sealing lips to flex angularly outwardly towards a radial plane, is to reduce the bearing load of the contact faces on the counterfaces.

As compared with prior proposals, the present invention provides for more positive sealing, by the provision of a definite sealing face, instead of indefinite line sealing contact of previous seals, and the divergent counterfaces provide a self-centering seat, for divergent frusto-conical contact faces of the sealing lips, promoting radial positional stability of the ring without interfering with its free floating location between the counterfaces.

Moreover, the consequent matching frusto-conical sealing contact between the contact faces and counterfaces provides for face sealing, as compared with line sealing, and this promotes dynamic sealing by a fluid film between the faces.

It will be appreciated that the effect of centrifugal force on fluid encountering a rotating sealing face is a tangential outward impulsion and this can maintain a stable film of fluid as a seal between closely opposed, nominally contacting, faces.

Preferably, the frusto-conical contact face of each lip has a minimum radial extent, between its inner and outer peripheral edges, 1.5 mm or a proportion of not less than 0.25 of the radial extent of the lip, whichever is the greater. Tests have shown such dimensions to be effective for speeds up to 500 R.P.M. (Revolutions per minute) but at higher speeds it is possible that somewhat narrower contact faces may be effective.

In one embodiment, the sealing ring is a moulded elastomeric ring with sealing lips diverging radially outwardly from a central web and, for high speeds at which the effect of centrifugal force might cause distortion of the web, a rigid ring may be provided to stiffen the web and thus stabilise its circular shape and size.

Figure 5:
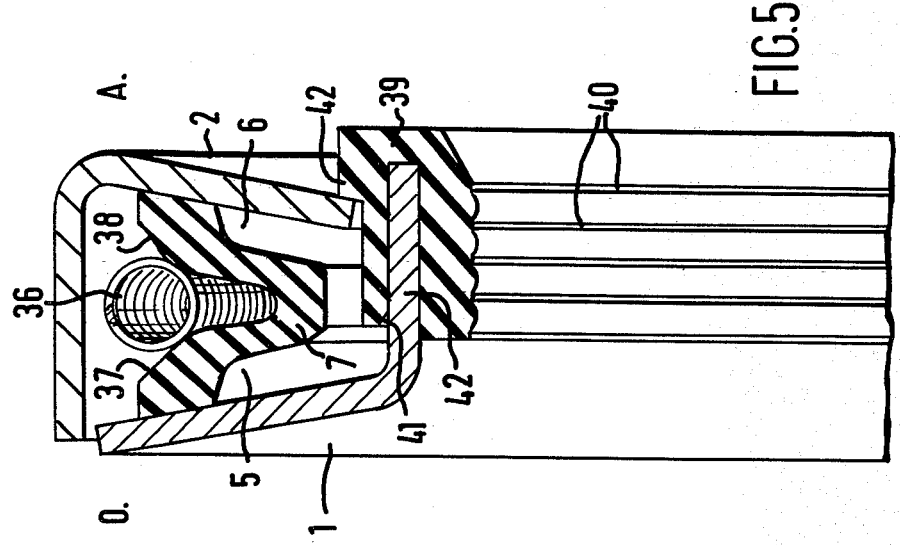
Figure 4:
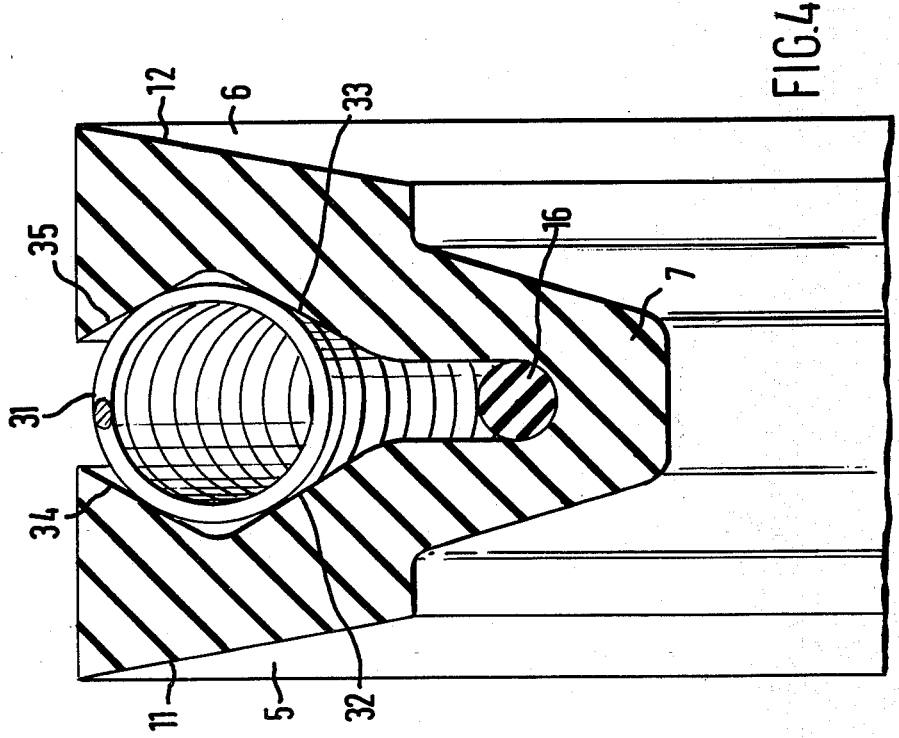

The invention will now be further described with reference to the accompanying drawings, in which:

FIG. 1 illustrates the Prior Art, being a half axial section of a known kind of seal in position on a shaft in a housing, FIG. 2, on a larger scale, is a half axial section of one embodiment of a seal in accordance with the invention in position on a shaft in a housing, FIG. 3 is a fragmentary axially radial section of an alternative form of sealing ring for a seal in accordance with the invention, FIG. 4 is a fragmentary axially radial section of a further form of sealing ring, and FIG. 5 is a half axial section of another embodiment of a seal in accordance with the invention.

The function of a shaft seal is to prevent leakage of oil along a shaft where it emerges from the housing of the machine in which the shaft runs and in the drawings the "oil side" of the seal is indicated by the reference "O" and the "air side" is indicated by the reference "A".

FIG. 1 of the drawings shows a prior art rotary shaft seal, as known from United Kingdom Patent Specification No. 591 522, comprising a sealing ring located between two coaxial casing rings to be mounted respectively one fluid-tight on a shaft S and the other fluid-tight in a surrounding housing H.

The casing rings 1 and 2 present axially opposed surfaces as counterfaces 3 and 4 to oppositely axially directed divergent sealing lips 5 and 6 of a substantially coaxial sealing ring 7, the sealing ring being free to float between the casing rings but having the lips, under the axial thrust of a compression spring 8, resiliently bearing in frictional contact with the counter-faces so that, on relative rotation of the casing rings, the sealig ring is frictionally driven into rotation but is intended to maintain a sealing relationship between edges 9 and 10, of the lips 5 and 6, and the counter-faces 3 and 4 respectively.

Examples of shaft seals according to the invention are illustrated by FIGS. 2 to 5 and, to facilitate comparison with and distinction from the prior art, corresponding reference numerals to those used in FIG. 1 are used for corresponding parts in FIG. 2. It should be noted that in FIG. 2 the oil side "O" and tha air side "A" are on opposite sides of the figure as compared with FIG. 1.

In FIG. 2 is shown a moulded elastomeric sealing ring 7, such as of an oil resistant nitrile rubber, and it will be seen that the lips 5 and 6 have well-defined frusto-conical faces 11 and 12 to bear against counterfaces 13 and 14 provided by radially outwardly divergent webs of the casing rings 1 and 2, the webs being of approximately matching frusto-conical shape but of substantially greater radial extent than the faces 11 and 12. The ring 7 is self-seating between the counterfaces 13 and 14 the axial spacing apart of which is such that the sealing ring 7 is lightly axially compressed for the contact faces 11 and 12 of the lips 5 and 6 to bear against the counterfaces sufficiently for the seal 7 to hold itself in place under static conditions. The unloaded shape of the lips 5 and 6 is indicated in broken lines. It does not matter whether the ring 7 is truly coaxial with the shaft so long as the radial extent of the counterfaces 13 and 14 is sufficient to ensure that the contact faces 11 and 12 always bear within the radial extent of the counterfaces.

When the shaft starts to rotate, the sealing ring 7 will tend to rotate with the counterface 13 but friction against the counterface 14 will tend to restrain rotation of the ring 7 so that the speed of rotation of the ring 7 will be less than that of the shaft. Due to rotation, the lips 5 and 6 of the ring 7 will be subject to centrifugal force the effect of which will be to cause them to tend to move angularly outwards towards radial planes away from the counterfaces 13 and 14. However, with such centrifugal-induced movement of the contact faces away from their counterfaces, the rotation imparted to the ring 7 will reduce as a result of reduction in the frictional contact. Centrifugal effect will therefore tend to diminish, allowing the contact faces to move back towards their counterfaces. The net result is that the ring 7 will float in a condition in which the contact faces bear on their counterfaces sufficiently for the ring 7 to be entrained in rotation but the speed of rotation of the ring 7 can never be so high that the contact faces lose contact through centrifugal action.

Due to the fact that the ring 7 is sealing against oil leakage, there will always be an oil film between the contact faces and their counterfaces and this oil film will be maintained as a hydrodynamic seal between the opposed surfaces. It will of course be understood that reference to contact of the faces 11 and 12 against the counterfaces 13 and 14 includes the condition of nominal contact with the interposition of an oil film.

Shaping of the lips 5 and 6 to present definite contact faces, as compared with only lines or edges, is essential for maintenance of an effective hydrodynamic oil film seal.

The contact faces are well defined by inner and outer peripheral edges and tests show that, for best results, they should have a minimum radial extent r of 1.5 mm or not less than 0.25 of the radial extent R of the lip, whichever is the greater.

It is possible that, at high rotational speeds, the sealing ring 7 as a whole could be subject to distortion under centrifugal effect and to prevent this the central web 15 of the ring 7, from which the lips 5 and 6 diverge, may be stiffened by a rigid ring 16, as indicated in broken lines, which may be embedded as an insert in the moulding or subsequently applied, as a split ring for example.

The relative axial positions of the casing rings 1 and 2 are set, by such means as a gauge or jig on mounting of the seal in place, so that, in the static condition, the contact faces 11 and 12 of the sealing ring 7 bear resiliently against their counterfaces 13 and 14 with a given load, dependent on the resilience of the material of the ring 7 and the separation of the counterfaces.

To maintain the seal as an assembly before and during installation, a retaining flange 17 is provided on the casing ring 1 and this adds the advantage of stiffening the ring thus enabling a light gauge material, such as pressed steel, to be used for the casing rings. Also the ring 2 may be stiffened by a flange 18 or by joggled rib or bead 19, as indicated in broken lines, which may more easily be formed in pressing.

To ensure static fluid sealing of the casing ring 1 on the shaft, a rubber bush 20 may be provided. Also the casing ring 2 may be provided with a static sealing flim or coating to seal in the housing, as is known practice for shaft seals.

For some sealing purposes, sealing rings need to be made of materials, such as polytetrafluoroethylene (PTFE) or other fluoro-carbon materials, which are more chemically resistant but less resilient than oil-resistant synthetic rubbers. To make sealing rings of such less-resilient materials, a construction as shown by FIG. 3 may be used.

In FIG. 3, a pair of PTFE rings 21 and 22 are mounted back-to-back by their inner peripheral margins 23 and 24 being conjointly clinched as a dovetail between the flanges of a U-section metal carrier ring 25.

The PTFE rings, which may be made from discs cut off from a cylindrical billet and coined to shape, are substantially of frusto-conical shape with an increase of conical angle at their outer peripheral margins so as to present frusto-conical contact faces 26 and 27 to bear against matching counterfaces of casing rings (not shown).

To ensure that the pair of rings 21 and 22 are fluid-tight at their junction, a sealing O-ring 28 is provided to seal the crotch of the rings.

The O-ring 28 may provide some resilient loading to urge apart the rings 21 and 22 to ensure that the contact faces 26 and 27 bear resiliently against their counterfaces. More positive loading is however preferably provided by two contractile spring rings 29 and 30, of the kind known as garter springs. The spring rings are of different diameters so as to rest between the rings 21 and 22 and urge them apart but the spring rings can yield, by expansion, to allow mutual approach of the outer margins of the rings 21 and 22 under centrifugal action.

FIG. 4 shows a moulded elastomeric sealing ring 7 especially suitable for use in a seal for high speed use, for example over 1000 RPM for a sealing ring of 140 mm outer diameter. This sealing ring has a stiffening metal ring 16 in the base of its U-shape, to resist centrifugal distortion. The ring also has an axial loading garter spring 31 which tends constantly to contract resiliently so as to bear against divergent inner faces 32 and 33 of the lips 5 and 6 but, under centrifugal force, tends to expand so as to bear against convergent outer faces 34 and 35 of the lips 5 and 6. In either case, the effect of the spring 31 is to tend to spread the lips apart and thus to promote either a static seal or a dynamic seal of the faces 11 and 12 against their counterfaces.

Another embodiment of a seal provided by the invention is shown by FIG. 5. The sealing ring 7 is a moulded elastomeric ring with a contractile garter spring 36 between divergent faces 37 and 38 of the lips 5 and 6.

At the inner peripheries of the casing rings 1 and 2, a rubber or other elastomeric bush 39 serves the dual purpose of static sealing on the shaft (not shown), and retention of the casing rings 1 and 2 in assembly with the ring 7 between them. The bush 39 may have inner circumferential ribs 40 to promote sealing against the shaft (not shown).

As can be seen, the bush 39 has a deep axially extending circumferential recess 41, which fits tightly on to an inner circumferential flange 42 of the casing ring 1, and an outer peripheral shoulder 43 which retains, by axial abutment, the casing ring 2. For assembly, the bush 39 can be passed into the central aperture of the casing ring 2 and then pressed into engagement of its recess 41 with the flange 42 of the casing ring 1.

In use of the seals of the present invention, the static resilient load of the sealing lips bearing on their counterfaces is sufficient to ensure a static seal, usually only required against fluid leakage under a static head. When the shaft is running, hydrodynamic seals are established between the sealing lips and their counterfaces as above described.

Although the invention has been described as applied to sealing rings with one pair of divergent sealing lips, the desired centrifugal effect could be obtained with multiple sealing lips or multiple contact faces such that the effect thereon of centrifugal force has a component directed axially away from the respective counterface.

Further, resilient loading of the lips of the sealing ring is not limited to that due to inherent resilience of the material of the sealing ring or to the provision of spring rings as illustrated in FIG. 3. Other spring means may be used, such as finger springs, or resilient loading means may be incorporated within the material or structure of the sealing ring so as to bias the lips either or both statically or dynamically under the influence of forces due to rotation of the sealing ring. Lip-bias or stress means incorporated in the sealing lip may also be utilised to affect the distribution of mass in the sealing lips and thus affect their behaviour under centrifugal force.

Care must of course be taken not to load the contact faces directly by any spring means which might interfere with the effect of centrifugal force acting uniformly on the contact faces.

The invention is not limited to a seal having casing rings. It will be apparent that counterfaces, corresponding to the faces 13 and 14, could be provided on suitable shoulders or flanges or relatively rotatable machine parts, such as a shaft and its housing.

I claim:

1. A rotary fluid seal, for preventing leakage of fluid between two coaxial relatively rotatable members, comprising a pair of axially opposed relatively rotatable counterface members, a circular flexible sealing ring freely located to float substantially coaxially between the conterface members, the sealing ring having a pair of radially outwardly divergent, oppositely axially directed, annular sealing lips to bear resiliently against the counterfaces respectively of the counterface members, so that the sealing ring is frictionally driven into rotation by one or the other of the counterface members on relative rotation thereof, the sealing lips each presenting to the respective counterface a frusto-conical contact face defined by radially inner and outer peripheral edges and the counterfaces being radially outwardly divergent and frusto-conical over an area provided for face contact by the sealing lip contact faces, the sealing ring being substantially coaxially located by seating between the counterfaces, and the effect of centrifugal force, due to rotation of the sealing ring, being to cause the sealing lips to tend to flex angularly outwardly towards a radial plane and thereby to reduce the bearing load of the contact faces on the counterfaces.

2. A rotary fluid seal according to claim 1, in which the relatively rotatable counterface members are respective casing rings with radially outwardly divergent webs presenting the axially opposed counterfaces.

3. A rotary fluid seal according to claim 2, in which one of the casing rings carries at a radially inner periphery an elastomeric bush providing both a static shaft sealing member and retention means holding the casing rings in assembly with the sealing ring between them.

4. A rotary fluid seal according to claim 1, in which the sealing ring is a moulded elastomeric ring with sealing lips diverging radially outwardly from a central web stiffened by a rigid ring to stabilise the circular shape and size of the sealing ring.

5. A rotary fluid seal according to claim 1, in which the sealing ring comprises a central carrier ring with a pair of sealing lip rings mounted on and diverging radially outwardly from the carrier ring.

6. A rotary fluid seal according to claim 4 or claim 5, in which the sealing lips have spring means between them acting radially to urge the lips apart so as indirectly to load the contact faces resiliently against the counterfaces.

7. A rotary fluid seal according to claim 1, in which the frusto-concial contact face of each lip has a minimum radial extent, between its inner and outer peripheral edges, of 1.5 mm or a proportion of not less than 0.25 of the radial extent of the lip, whichever is the greater.

* * * * *